(12) United States Patent
Vordermaier et al.

(10) Patent No.: US 6,369,537 B1
(45) Date of Patent: Apr. 9, 2002

(54) DEVICE FOR DISPLACING MOVABLE PARTS ON MOTOR VEHICLES

(75) Inventors: Claus Vordermaier, München; Bernd Bauer, Gauting, both of (DE)

(73) Assignee: Webasto Karosseriesysteme GmbH, Stockdorf (DE)

( * ) Notice: Subject to any disclaimer, the term of this patent is extended or adjusted under 35 U.S.C. 154(b) by 0 days.

(21) Appl. No.: 09/362,037

(22) Filed: Jul. 28, 1999

(30) Foreign Application Priority Data

Aug. 1, 1998  (DE) .......................................... 198 34 823

(51) Int. Cl.⁷ ............................................... H20P 3/26
(52) U.S. Cl. ...................... 318/282; 318/280; 318/445; 318/446
(58) Field of Search ................................ 318/375, 466, 318/468, 489, 54, 57, 280–284

(56) References Cited

U.S. PATENT DOCUMENTS

| | | | | |
|---|---|---|---|---|
| 3,572,822 A | * | 3/1971 | Schimid ...................... 296/137 |
| 4,354,147 A | * | 10/1982 | Klaussner .................... 318/363 |
| 4,495,456 A | * | 1/1985 | Vercillo et al. ............. 318/755 |
| 4,556,831 A | * | 12/1985 | Sakamoto et al. .......... 318/434 |
| 4,698,560 A | * | 10/1987 | Andrei-Aexandru et al. . 318/54 |
| 4,910,445 A | * | 3/1990 | Bormann .................... 318/468 |
| 4,931,711 A | * | 6/1990 | Naruo .................... 318/568.13 |
| 5,101,684 A | | 4/1992 | Mösslacher |
| 5,282,428 A | * | 2/1994 | Greville et al. ............. 110/250 |
| 5,448,142 A | * | 9/1995 | Severson et al. ........... 318/280 |
| 5,486,759 A | * | 1/1996 | Seiler et al. ............. 324/207.2 |
| 5,566,593 A | | 10/1996 | Vordermaier ................ 74/625 |
| 5,672,070 A | * | 9/1997 | Weiss ......................... 439/213 |

FOREIGN PATENT DOCUMENTS

| | | |
|---|---|---|
| DE | 1 914 580 | 10/1969 |
| DE | 25 49 964 | 5/1977 |
| DE | 26 46 634 | 4/1978 |
| DE | 40 27 767 | 3/1992 |
| DE | 40 40 460 | 7/1992 |
| DE | 44 19 176 | 6/1995 |
| EP | 0 278 536 | 8/1988 |

* cited by examiner

*Primary Examiner*—Marlon T. Fletcher
*Assistant Examiner*—Rita Leykin
(74) *Attorney, Agent, or Firm*—Nixon Peabody LLP; David S. Safran

(57) ABSTRACT

A device for displacement of a movable part on motor vehicles such as sliding roofs, windows or the like including an electrical servomotor permanently mechanically coupled to the movable part and a supply circuit adapted to operate the electrical servomotor and to brake the electrical servomotor by short circuiting the electrical servomotor when the movable part reaches a desired position, where the supply circuit includes an isolating device for breaking the supply circuit to prevent short circuit braking of the electrical servomotor thereby allowing manual displacement of the movable part.

15 Claims, 5 Drawing Sheets

DEVICE FOR DISPLACING MOVABLE PARTS ON MOTOR VEHICLES

BACKGROUND OF THE INVENTION

1. Field of the Invention

The present invention relates to a device for displacement of movable parts on motor vehicles such as sliding roofs, windows or the like. More specifically, the present invention relates to such a device for displacement including an electrical servomotor mechanically coupled to the movable part and a supply circuit for braking the servomotor.

2. Description of the Related Art

Prior art devices of this type is generally illustrated in the published German Patent Application Nos. 1 914 580, 25 49 964, and 26 46 634. These devices for displacement are designed such that short circuit braking of the servomotor takes place when the movable part reaches a predetermined set position such as an end position. The movable part is moved out of this set position by the corresponding triggering of the servomotor.

Furthermore, a drive device for a part of a motor vehicle which can be adjusted between end positions is illustrated in U.S. Pat. No. 5,566,593 which includes an electric motor connected to a rack via a step-down gearing which has a worm wheel. The rack is located on a driven shaft and is drive-coupled via drive cables to the adjustable part. The electric motor is shut down by an operating mechanism in at least one predetermined position of the adjustable part. A ratchet wheel of an eccentric wheel gear is drive-coupled to the step-down gearing for activation of the operating mechanism. In this reference, the drive shaft, the driving part of the eccentric wheel gear, and the worm wheel are provided with form-fitting means which enable axial displacement of the drive shaft for emergency activation of the rack with simultaneous decoupling of the worm wheel and the drive shaft. This approach requires numerous mechanical parts so that production and installation costs are relatively high. In addition, there can be a high noise level during the operation of the device due to frictional rubbing of the parts.

SUMMARY OF THE INVENTION

A first object of the present invention is to devise a device for displacing movable parts on a motor vehicle which allows emergency activation of the movable parts with relatively low expenditure of force.

Another object of the present invention is to provide such a device for displacement of movable parts with relatively few mechanical components.

Yet another object of the present invention is to provide such a device which minimizes production costs and installation costs.

These and other objects are achieved by a device for displacement of movable parts on a motor vehicle in accordance with the present invention including an electrical servomotor which is permanently mechanically coupled to a movable part and a supply circuit adapted to operate the electrical servomotor, the supply circuit including an isolating means by which the supply circuit can be broken to prevent short circuit braking of the servomotor.

The permanent mechanical coupling of the servomotor and the movable part means that a clutch between the servomotor and the movable part is eliminated. During emergency activation of the movable part such as when the motor vehicle voltage fails, the present invention allows the movable part to be operated by hand with low expenditure of force because it is not necessary to work against a plug brake of the electrical servomotor.

In one embodiment, the direction of rotation of the servomotor is reversible in the conventional manner and there is provided a reversing operating mechanism in the supply circuit for selectively dictating the direction of rotation of the servomotor. Preferably, the isolating means and the reversing operating mechanism are coupled to one another such that in the normal operational state, i.e. when the displacement device is working properly, short circuit braking of the servomotor takes place in any position of the movable part. This ensures prompt and exact stopping of the movable part not only in predetermined positions such as the end positions, but also in any position therein between.

The isolating means can be located between a voltage supply and the reversing operating mechanism or alternatively, between the reversing operating mechanism and the servomotor, thereby yielding an especially compact, space-saving circuit design. The latter embodiment applies mainly when the isolating means is integrated into the reversing operating mechanism.

The isolating means is preferably designed such that upon failure of the feed voltage, the supply circuit is automatically broken. In such an embodiment, no additional action on the isolating means is necessary to prevent the plug brake and allow emergency activation of the movable part. In another embodiment, a structure for independently activating the isolating means may also be provided.

The isolating means may have at least one relay or solid-state switch such as a field effect transistor. Preferably, the isolating relay is provided with a contact which breaks the supply circuit when the isolating relay drops out. Alternatively, the solid-state switch is designed and arranged such that the solid-state switch disables automatically when the feed voltage fails.

In yet another embodiment of the present invention, the isolating means may include at least one manually operated switch, button, or a plug-and-socket connection which can be detached manually to break the supply circuit and terminate the short circuit braking. In this regard, the plug-and-socket connection can be made as a tension element and a fuse may be integrated into the plug-and-socket connection.

These and other objects, features and advantages of the present invention will become more apparent from the following detailed description of the preferred embodiments of the invention when viewed in conjunction with the accompanying drawings.

DETAILED DESCRIPTION OF THE INVENTION

Figure 1:
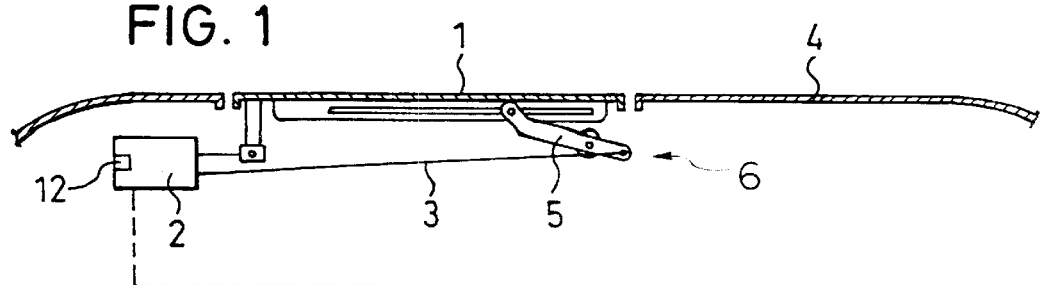
FIG. 1 shows a side profile view of a lifting-sliding roof in a closed position and a schematic view of a servomotor and a supply circuit in accordance with one embodiment of the present invention.
Figure 2:
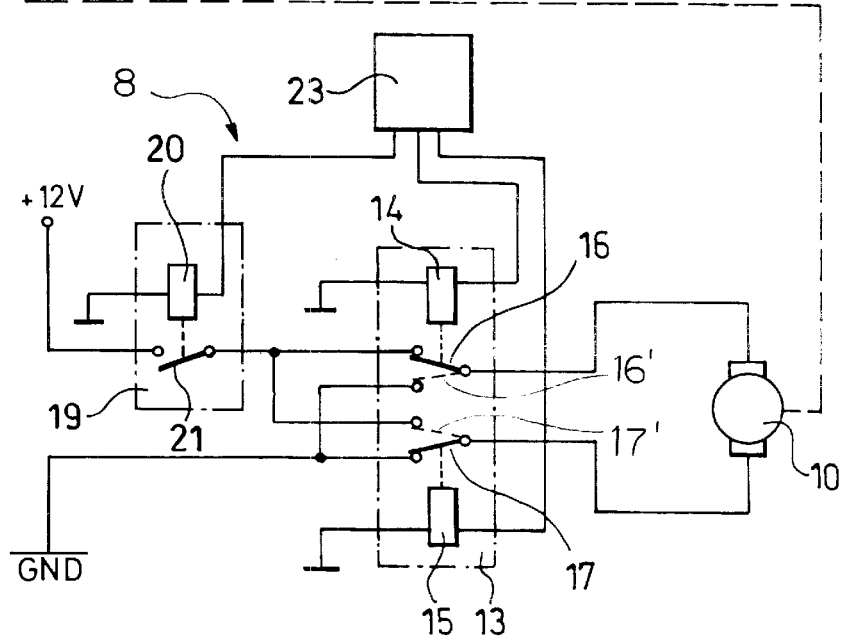
FIG. 2 shows a side profile view of the lifting-sliding roof from FIG. 1 in a raised position.
Figure 2:
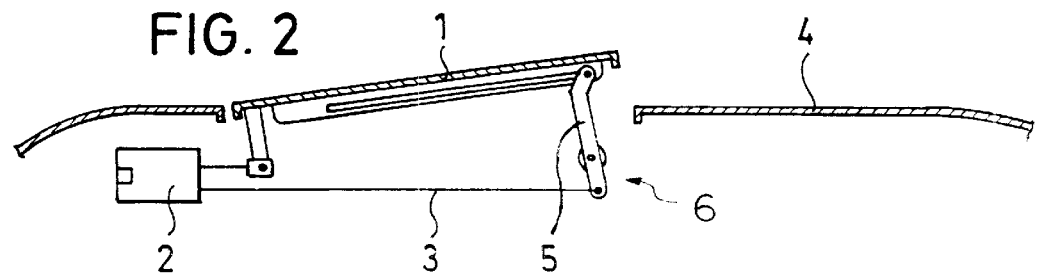
Figure 3:
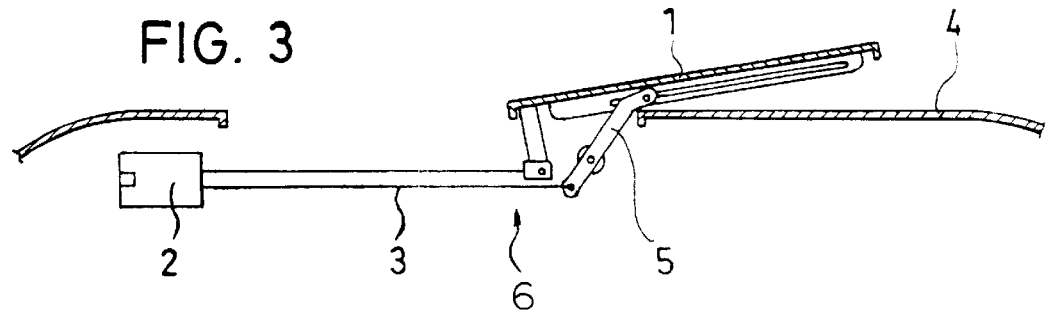
FIG. 3 shows a side profile view of the lifting-sliding roof from FIG. 1 in a pushed-back position.

In the embodiment of the present invention shown in FIGS. 1 to 3, the cover 1 of a lifting-sliding or spoiler type roof 4 is selectively adjustable between the closed position shown in FIG. 1, a raised ventilation position shown in FIG. 2 and a fully opened position of FIG. 3 where the cover 1 is pushed back towards the rear and over the solid roof 4. The cover 1 is made selectively adjustable by an displacement device 6 which in the present illustrated embodiment, includes drive elements 3 which may be rigid drive cables or another suitable element. The drive elements 3 in the present embodiment are connected to the cover 1 via an displacement mechanism 5. The specifics and the manner of how the displacement device 6 is coupled to the cover 1 is not significant in practicing the present invention, thus, the illustrated embodiment is shown as an example only and many other couplings can be used in practicing the present invention depending on the application. In fact, whereas the present invention is described herein below with respect to the cover 1, the present invention may be effective applied to any motor vehicle application where it is desirable to adjust a movable part using an electrical servomotor including windows, sun roofs, moon roofs, foldable roofs, etc.

As can be seen in FIG. 1, the displacement device 6 in accordance with the illustrated embodiment includes an electrical servomotor 10 and step-down gearing 2 drivingly connected thereto. The output of the gearing 2 is drive-coupled to the drive elements 3. The electrical servomotor 10 is permanently mechanically coupled to the cover 1 via the step-down gearing 2, the drive elements 3 and the displacement mechanism 5. However, it should be noted that when an electric motor drive (not shown) in the electrical servomotor 10 fails, the cover 1 can be adjusted by hand and be moved into its closed position (so-called emergency activation). This can be attained by providing an emergency activation tool (not shown) and engaging the tool receiving part 12 of the step-down gearing 2 to manually operate the cover 1 as generally shown in the German Patent DE 44 19 176 C1.

The present illustrated embodiment supply circuit 8 for operating the electrical servomotor 10 is provided with a reversing operating mechanism 13 which is generally indicated by the broken lines. Whereas a reversing operating mechanism 13 is not required to practice the present invention in many application, including the illustrated lifting-sliding type roof 4, such provisions would be desirable. The reverse operating mechanism 13 includes two relays 14 and 15. Each of the relays 14 and 15 has one changeover contact 16 and 17 respectively. The reversing operating mechanism 13 makes it possible to reverse the supply voltage applied to the servomotor 10 from a voltage source (not shown) generally indicated as +12V and GND in FIG. 1 thereby allowing the direction of rotation of the electrical servomotor 10 to be reversed. The isolating means 19 in accordance with the present embodiment includes another relay 20 operating a make contact 21 connected between the positive side +12V of the voltage source and a terminal connected to each of the changeover contacts 16 and 17. The relays 14, 15, and 20 are triggered by a control stage 23. FIG. 1 illustrates the positions these relays assume when they are dropped out (de-energized).

If from the de-energized state shown in FIG. 1, the relay 20 is picked up (energized) by the control stage 23 to close the make contact 21, electrical current in the supply circuit 8 of the electrical servomotor 10 flows from the positive +12V side of the voltage source via the contacts 21 and 16, through the servomotor 10, then through the changeover contact 17 to the negative side GND of the voltage source. As can be appreciated, when the electrical current flows through the supply circuit in this manner, the electrical servomotor 10 is rotated in one direction.

If from the de-energized state shown in FIG. 1, the relay 20 is picked up (energized) by the control stage 23 to close the make contact 21, and moreover, relays 14 and 15 are also picked up by the control stage 23, the changeover contacts 16 and 17 are switched to an alternate positions indicated by the dashed lines 16' and 17' so that the electrical current flows in the direction opposite to that described in the paragraph above. More specifically, when the positions of the changeover contacts 16 and 17 are switched to 16' and 17', the electric current in the supply circuit 8 flows from the positive +12V side of the voltage source via the contacts 21 and 17, through the servomotor 10, then through the changeover contact 16 to the negative side GND of the voltage source. As can be appreciated, when the electrical current flows through the supply circuit in this manner, the electrical servomotor 10 is rotated in an opposite direction to that described in the previous paragraph.

To shut down the electrical servomotor 10 from running in one direction or the other, the relays 14 and 15 may be triggered by the control stage 23 so that the changeover contacts 16 and 17 are both brought into electrical connection with either the negative side GND of the voltage source (such as 16' and 17) or the positive side +12V of the voltage source (such as 16 and 17'). In either of these cases, the electrical servomotor 10 is short circuited and thus, quickly plug braked to a standstill.

The short circuited state discussed above can be terminated by either changing the position of one of the changeover contacts, or by operating the relay 20 so that make contact 21 is opened. This breaks the electric current in the supply circuit 8 and the electrical servomotor 10 is de-energized. In this manner, short circuit braking is terminated and in the course of emergency activation, the cover 1 or other moveable part to which the present invention is applied, can be manually adjusted together with the gearing 2 and the servomotor 10 with relatively low exertion of force.

Figure 4:
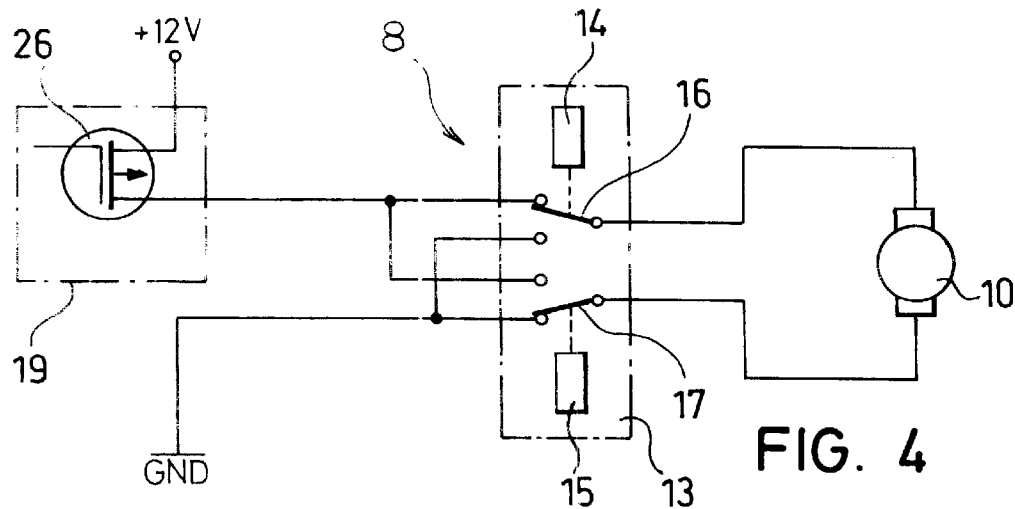
FIG. 4 to FIG. 8 each show a schematic view of one embodiment of the supply circuit in accordance with the present invention.

In the embodiment shown in FIG. 4, the isolating means 19 does not have a relay, but instead, includes a solid-state switch in the form of a field effect transistor 26 which may be triggered by the control stage 23 of FIG. 1 in a manner similar to relay 20 of FIG. 1. This embodiment would function in an analogous manner to the embodiment described above.

Figure 5:
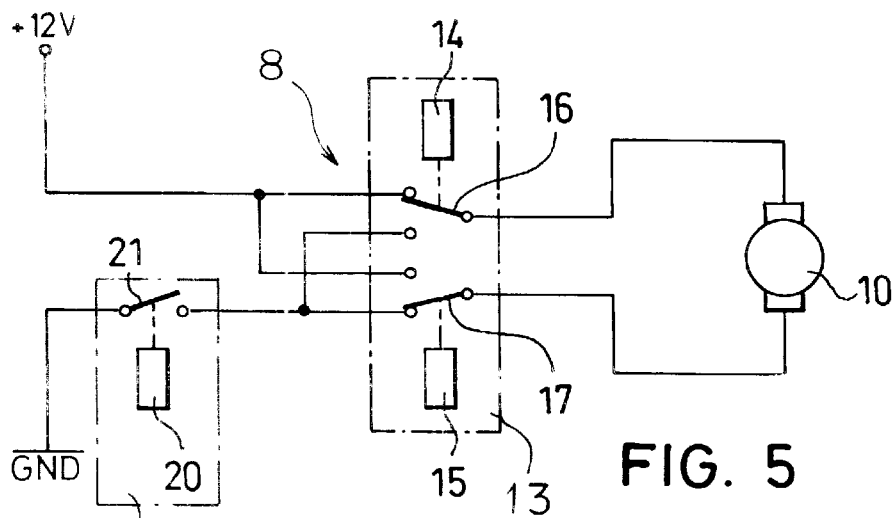
Figure 6:
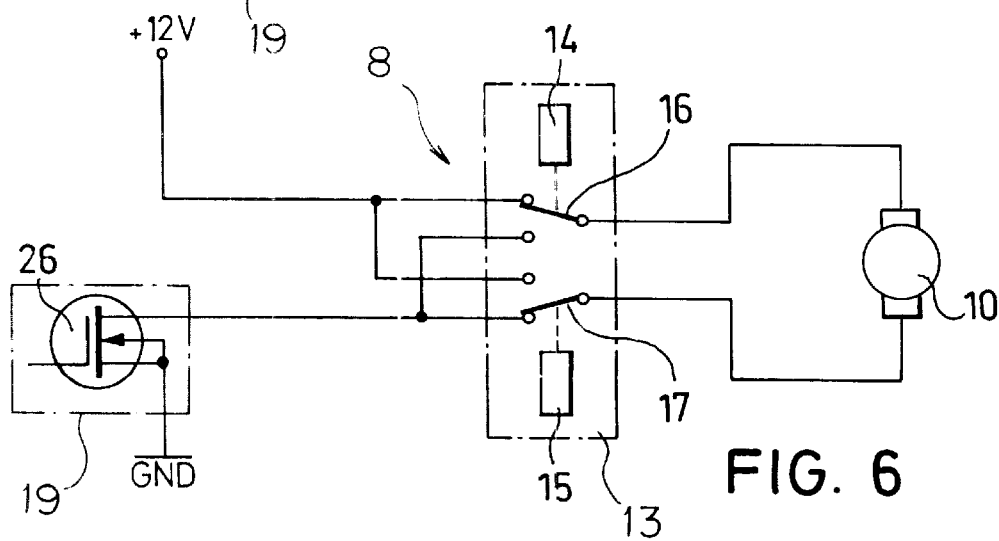

The embodiments shown in FIGS. 5 and 6 differ from those of FIGS. 1 and 4 only in that the isolating means 19 such as the relay 20 or the field effect transistor 26 is connected to the negative side GND of the voltage source instead of the positive side +12V of the voltage source. Again, these embodiments would also function analogously to the embodiments described above.

Figure 7:
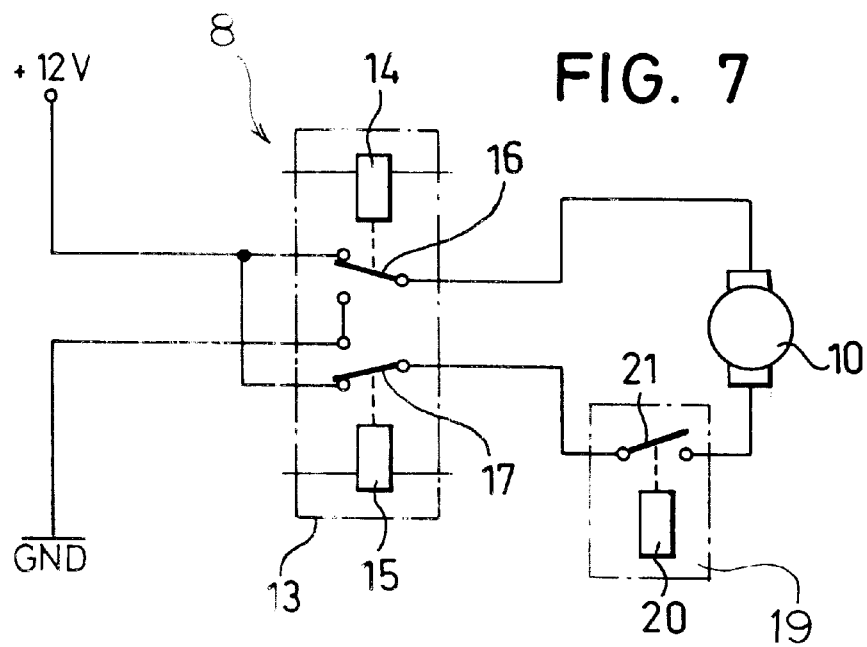

While in the embodiments explained above thus far, the isolating means 19 is positioned between the voltage source (+12V, GND) and the reversing operating mechanism 13, the isolating means 19 with the relay 20 may alternatively be positioned between the reversing operating mechanism 13 and the electrical servomotor 10 itself as shown in the embodiment of FIG. 7. This embodiment can also be operated in a manner analogous to the operation described above.

Figure 8:
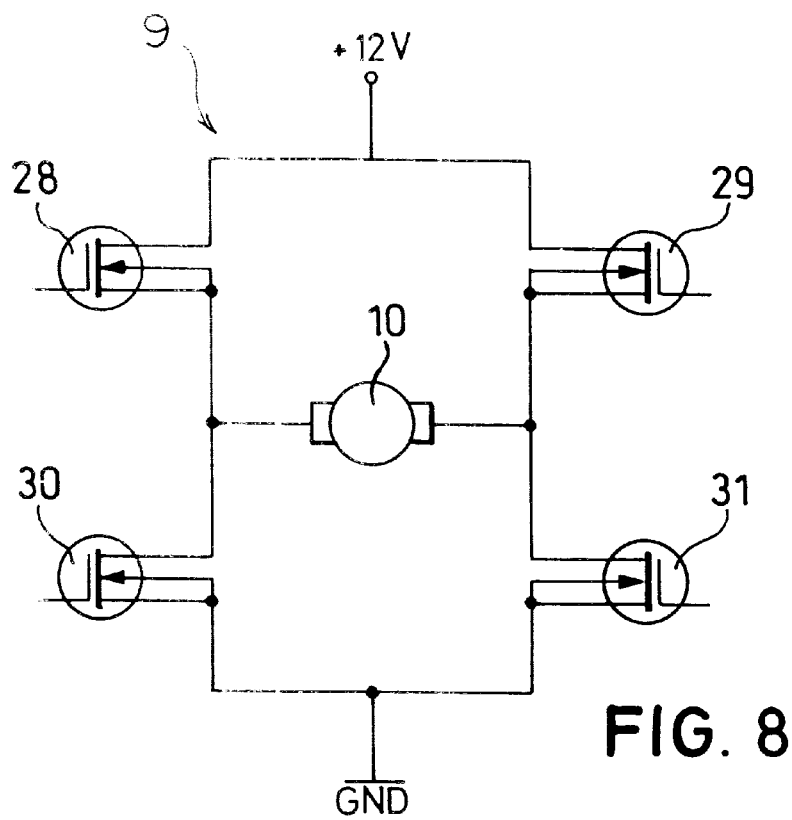

FIG. 8 shows one embodiment of the present invention in which the isolating means is integrated into the reversing operating mechanism which in turn is integral with the solid-state full bridge circuit 9. In this embodiment, the electrical servomotor 10 is located in one diagonal of the solid-state full bridge circuit 9 with solid-state switches in the form of field effect transistors 28, 29, 30, and 31. The other diagonal of the solid-state full bridge circuit 9 is electrically connected to the voltage source (+12V, GND). By operating the control stage 23 to trigger one or more of the field effect transistors 28, 29, 30, and 31, a function can be achieved which is analogous to the mode of operation explained above in detail relative to the embodiment of FIG. 1.

Figure 9:
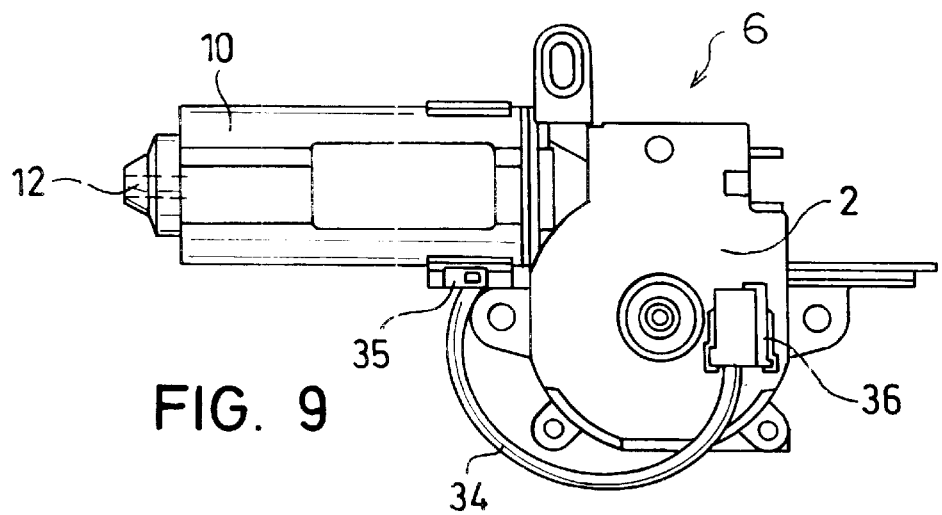
FIG. 9 and FIG. 10 each show a front view of a lifting-sliding roof drive with a manually operated switch (or button) in accordance with the present invention.
Figure 10:
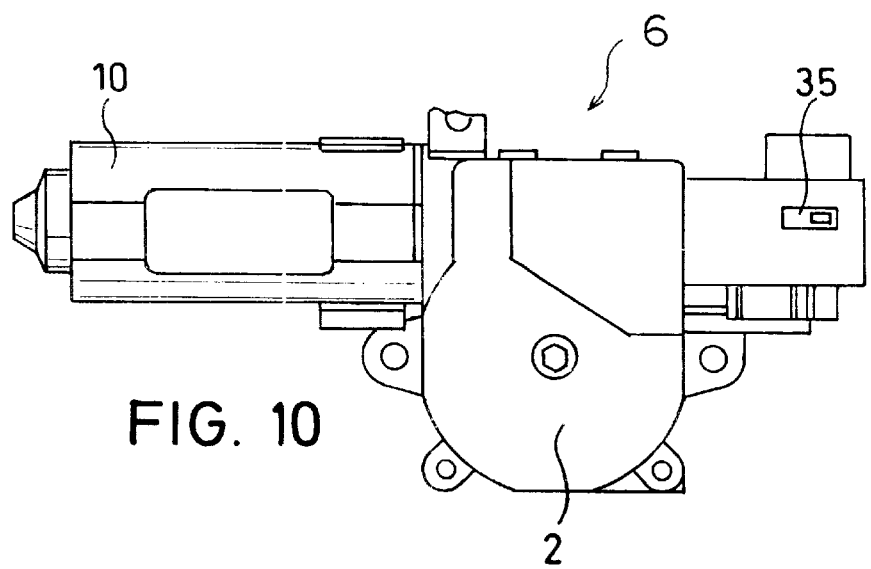
Figure 11:
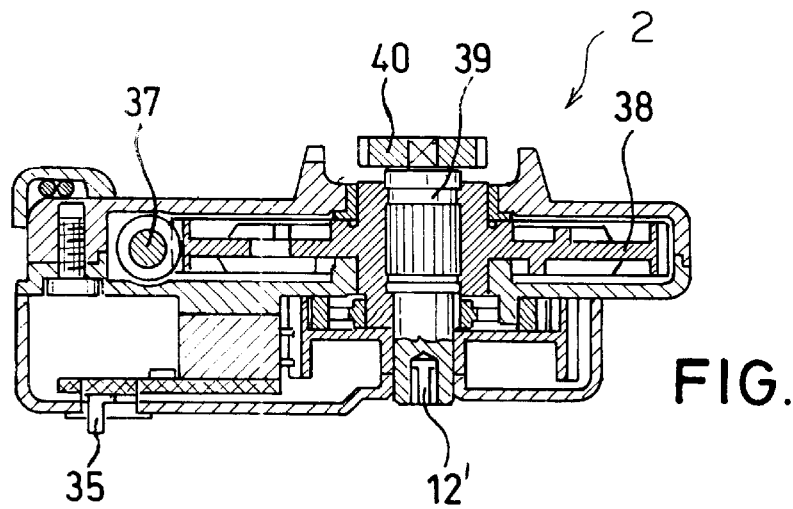
FIG. 11 illustrates a cross-sectional view of the step-down gearing in accordance with the present invention.

The embodiments shown in FIGS. 9, 10 and 11 include the supply circuit 8 with the electrical servomotor 10 as previously described relative to the embodiments of FIGS. 1, 5 or 7. The relay 20 is manually operable via a button or a switch 35 which controls the position of the make contact 21. The button or switch 35 is actuated by hand in an emergency activation situation in order to break the supply circuit 8 and thus, to prevent undesired short circuit braking of the electrical servomotor 10 during emergency activation. In a normal operational state, the button or the switch 35 is closed such that the make contact 21 is closed and the supply circuit 8 is operable. As the embodiments of FIGS. 9, 10 and 11 show, the button or the switch 35 can be located essentially anywhere on the displacement device 6. All that is important is that the button or switch 35 be accessible for emergency activation. FIG. 9 also shows a power supply cable 34 which leads from a coupling piece 36 to the electrical servomotor 10, the coupling piece 36 being adapted to electrically connect the electrical servomotor 10 to the voltage supply (not shown).

The cross-sectional view of FIG. 11 clearly shows that the step-down gearing 2 includes a worm shaft 37 which is connected to the shaft of the electrical servomotor 10 and a worm wheel 38 which engages the worm shaft 37. The worm wheel 38 is connected to a driven shaft 39 which mechanically engages a rack 40. The rack 40 engages the drive elements 3 which were explained above relative to FIG. 1 and which may include drive cables.

The tool receiving part 12 can be provided in the manner indicated in FIG. 9 on an end of a motor shaft opposite the worm shaft 37 shown in FIG. 11. Alternatively, if the step-down gearing 2 is not self-locking, the tool receiving part 12' may be provided on an end of the driven shaft 39 which is opposite the rack 40 as shown in FIG. 11. The tool receiving part 12 or 12' can be made as a hexagonal hole in the conventional manner for receiving an emergency activation tool such as a hexagonal wrench (not shown).

Figure 12:
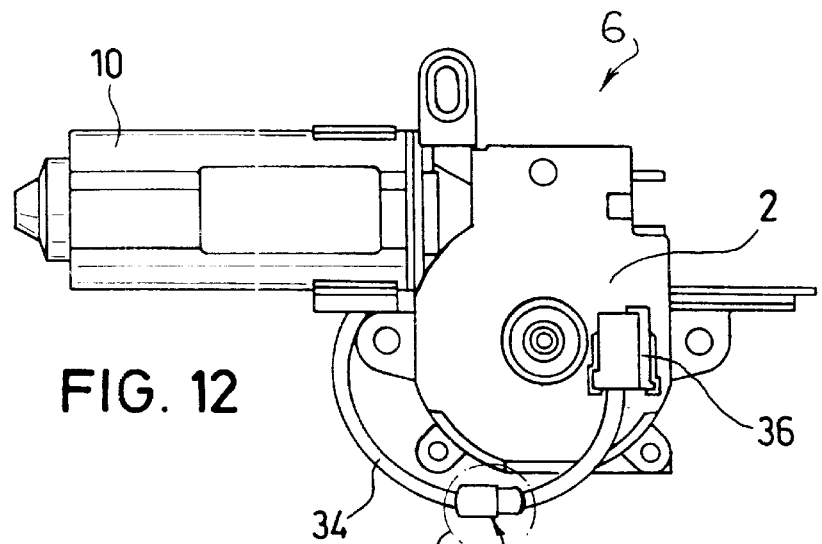
FIG. 12 illustrates a lifting-sliding roof drive with a plug-and-socket connection positioned in the supply circuit of the servomotor in accordance with one embodiment of the present invention.
Figure 13:
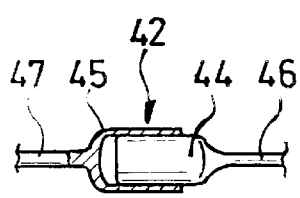
FIG. 13 shows a detailed view of area A of FIG. 12.

The displacement device 6 as shown in FIG. 12 corresponds to that in FIG. 9 except that instead of the switch 35, there is provided a plug-and-socket connection 42 positioned in the power supply cable 34 and makes it possible to interrupt the power flowing through the power supply cable 34 for emergency activation purposes. As shown in the detailed view of FIG. 13, the plug-and-socket connection 42 includes a plug 44 on one section 46 which fits into a socket 45 on another section 47 to establish a continuous electrical connection through the power supply cable 34. The power flowing through the power supply cable 34 may be interrupted by disconnecting the plug 44 and the socket 45 from one another.

Figure 15:
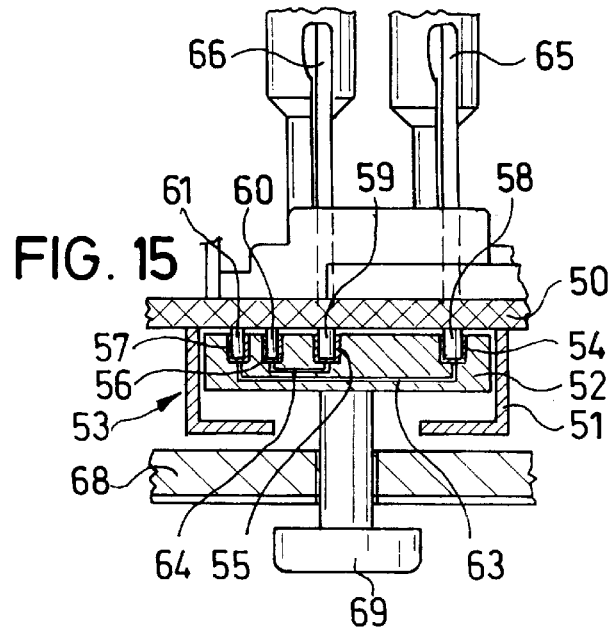
FIG. 15 shows a detailed view of area B of FIG. 14.
Figure 14:
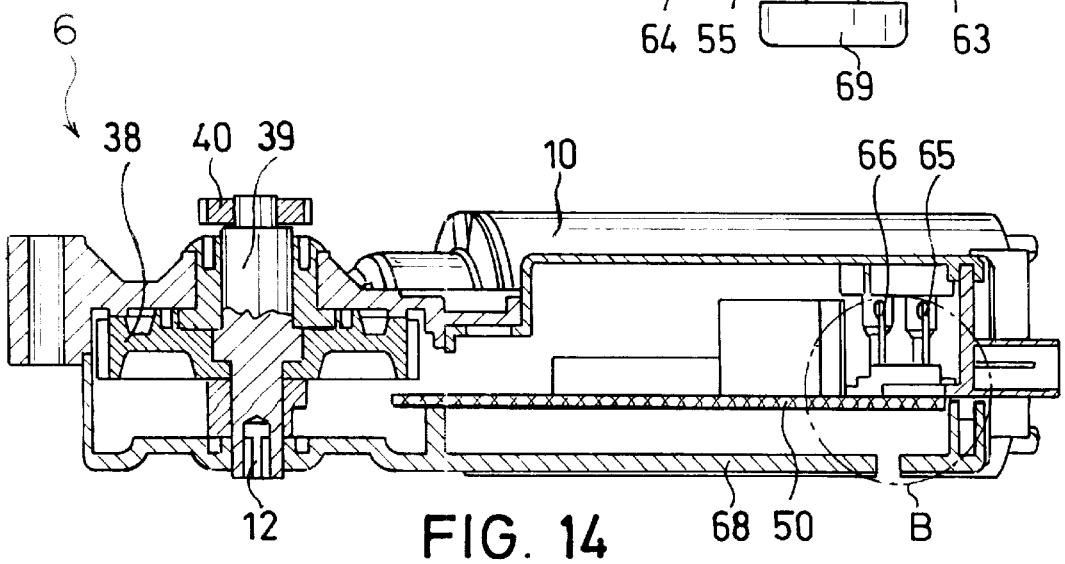
FIG. 14 shows a lifting-sliding roof drive with another embodiment of a plug-and-socket connection which is located in the supply circuit of the servomotor.

FIGS. 14 and 15 show another embodiment of the present invention in which a guide 51 is attached to a circuit board 50 of the displacement device 6. In the guide 51, there is positioned an electrically insulating socket mount 52 of a plug-and-socket connection 53 which is made as a tension element for use as the isolating means of the present invention. In this regard, the socket mount 52 has four sockets 54, 55, 56 and 57 which adapted to electrically engage complementary plug parts 58, 59, 60 and 61. The plug parts 58 and 59 are electrically connected to the power supply contacts 65 and 66 through which the electrical servomotor 10 is supplied with electrical current. In addition, power supply lines (not shown) are connected to the plug parts 60 and 61. The sockets 54 and 57 and sockets 55 and 56 are each conductively interconnected via wire clips 63 and 64 respectively. Electrically conductive connection is established in the manner shown in FIG. 15 which shows the sockets 54, 55, 56, and 57 engaged with the plug parts 58, 59, 60, and 61 in a normal operational state to provide electrical power to the electrical servomotor 10. In this manner, the electrical servomotor 10 can then be supplied with electrical power thereby allowing the displacement of the cover 1 or other movable part. The electrical servomotor 10 may be short circuited and thus, plug braked in a manner analogous to the above explained embodiments when the cover 1 reaches the desired position. However, in the emergency activation state, a handle part 69 which extends through a housing wall 68 the socket mount 52 in FIG. 15 may be pulled down to disengage the sockets 54, 55, 56, and 57 from the plug parts 58, 59, 60, and 61. In this manner, the power supply to the servomotor 10 can be interrupted and the plug brake deactivated to allow manual displacement. A fuse can also be provided in the plug-and-socket connection 53 if necessary. This can be effectively implemented by making either the wire clip 63 and/or the wire clip 64 as a fusible link wire which melts when the motor current exceeds a stipulated maximum value.

In this manner, the present invention provides a device for displacing movable parts on a motor vehicle which allows emergency activation with relatively low expenditure of force. The present invention also provides such a device with relatively few mechanical components and minimizes production costs and installation costs.

While various embodiments in accordance with the present invention have been shown and described, it is understood that the invention is not limited thereto. The present invention may be changed, modified and further applied by those skilled in the art. Therefore, this invention is not limited to the details shown and described previously, but also includes all such changes and modifications which are encompassed by the appended claims.

We claim:

1. Device for displacement of a movable part on motor vehicles comprising:

an electrical servomotor permanently mechanically coupled to said movable part; and a supply circuit adapted to operate said electrical servomotor and to brake said electrical servomotor by short circuiting said electrical servomotor when said movable part reaches a desired position;

wherein said supply circuit includes an isolating means for breaking said supply circuit to prevent short circuit braking of said electrical servomotor thereby allowing manual displacement of said movable part wherein said isolating means automatically breaks said supply circuit upon failure of a voltage source.

2. Device of claim 1, wherein said electrical servomotor has a direction of rotation which is reversible; and wherein said supply circuit includes a reversing operating mechanism adapted to selectively control the direction of rotation of said electrical servomotor.

3. Device of claim 2, wherein said isolating means and said reversing operating mechanism are electrically coupled to one another in a manner that, in a normal operating state, short circuit braking of said electrical servomotor occurs when said movable part is adjusted to any position.

4. Device of claim 2, wherein said isolating means is positioned between a voltage source and said reversing operating mechanism.

5. Device of claim 2, wherein said isolating means is positioned between said reversing operating mechanism and said electrical servomotor.

6. Device of claim 1, wherein said isolating means is integrated into said reversing operating mechanism.

7. Device of claim 1, wherein said isolating means includes at least one relay.

8. Device of claim 7, wherein said at least one relay includes a make contact which breaks said supply circuit when said at least one relay is de-energized.

9. Device of claim 1, wherein said isolating means includes at least one solid-state switch.

10. Device of claim 9, wherein said at least one solid-state switch is automatically disabled upon failure of a voltage source.

11. Device of claim 9, wherein said at least one solid-state switch is a field-effect transistor.

12. Device for displacement of a movable part on motor vehicles comprising:

an electrical servomotor permanently mechanically coupled to said movable part; and a supply circuit adapted to operate said electrical servomotor and to brake said electrical servomotor by short circuiting said electrical servomotor when said movable part reaches a desired position;

wherein said supply circuit includes an isolating means for breaking said supply circuit to prevent short circuit braking of said electrical servomotor thereby allowing manual displacement of said movable part;

wherein said isolating means includes at least one of a manually operated switch and a manually operated button.

13. Device for displacement of a movable part on motor vehicles comprising:

an electrical servomotor permanently mechanically coupled to said movable part; and a supply circuit adapted to operate said electrical servomotor and to brake said electrical servomotor by short circuiting said electrical servomotor when said movable part reaches a desired position;

wherein said supply circuit includes an isolating means for breaking said supply circuit to prevent short circuit braking of said electrical servomotor thereby allowing manual displacement of said movable part;

wherein said isolating means includes at least one plug-and-socket connection adapted to be manually disconnected.

14. Device of claim 13, wherein said at least one plug-and-socket connection includes a tension element.

15. Device of claim 13, wherein said at least one plug-and-socket connection includes a fuse.

* * * * *